United States Patent
Schumacher et al.

(10) Patent No.: US 6,531,618 B1
(45) Date of Patent: Mar. 11, 2003

(54) PROCESS FOR PREPARING WATER-SOLUBLE CATALYSTS

(75) Inventors: Oliver Schumacher, Werne (DE); Ursula Gerigk, Waltrop (DE)

(73) Assignee: Crompton GmbH, Bergkamen (DE)

( * ) Notice: Subject to any disclaimer, the term of this patent is extended or adjusted under 35 U.S.C. 154(b) by 0 days.

(21) Appl. No.: 09/579,305

(22) Filed: May 25, 2000

(30) Foreign Application Priority Data

May 26, 1999 (DE) .......................................... 199 24 101

(51) Int. Cl.$^7$ .................................................. C07F 7/22
(52) U.S. Cl. ............................ 556/15; 556/19; 556/55; 556/88; 556/90; 556/91; 556/93
(58) Field of Search .............................. 556/15, 19, 85, 556/88, 90, 91, 93

(56) References Cited

U.S. PATENT DOCUMENTS

| | | |
|---|---|---|
| 2,720,507 A | 10/1955 | Caldwell |
| 3,392,128 A | 7/1968 | Hostettler et al. |
| 3,393,153 A | 7/1968 | Zimmerer et al. |
| 4,021,392 A | 5/1977 | Milne et al. |
| 4,032,468 A | 6/1977 | Treadwell et al. |
| 4,286,073 A | 8/1981 | Coe |
| 4,954,472 A | 9/1990 | Scott et al. |
| 5,436,357 A | 7/1995 | Jiang et al. |
| 5,561,205 A | 10/1996 | Jiang et al. |

FOREIGN PATENT DOCUMENTS

WO          98/28256          7/1998

OTHER PUBLICATIONS

Evens et al., "Organotin Compounds in Modern Technology", Chapter 3, pp 56–100, Elsevier Science Publishing Co., New York, New York (ISBN 0–444–42422–9).
Blunden eta l., "The Industrial Uses of Tin Chemicals", Chapter 8, 136–163, The Royal Society of Chemistry, London (ISBM 0–85186–927–0).
Omae, "Organotin Chemistry",931–928, Elsevier Science Publishing Co., New York, New York, (1985) (ISMB 0–444–87456–9).

*Primary Examiner*—Paul F. Shaver
(74) *Attorney, Agent, or Firm*—Scully, Scott, Murphy & Presser

(57) ABSTRACT

The invention relates to a process for preparing water-soluble organotin catalysts by contacting organotin compounds with polyelectrolytes and, optionally, subsequently removing the water.

5 Claims, No Drawings

US 6,531,618 B1

PROCESS FOR PREPARING WATER-SOLUBLE CATALYSTS

BACKGROUND OF THE INVENTION

1. Field of the Invention

The invention relates to water-soluble organotin catalysts.

2. Description of the Prior Art

The use of organotin compounds as catalysts for esterification and transesterification reactions and for preparing or curing polymers, especially polyurethanes, polysiloxanes and polyesters, is known.

Examples of organotin catalysts common on the market are mono- and dialkyltin compounds of tetravalent tin, of the formulae:

$$R^a SnX^a{}_3,\ R^a{}_2 SnX^a{}_2,\ [R^a{}_2 SnO]_x,\ R^a SNOOH$$

or $$X^a\!-\!\!\left[\begin{array}{c}R^a\\|\\Sn\\|\\R^b\end{array}\!-\!O\right]_y\!\!-\!\!\begin{array}{c}R^a\\|\\Sn\\|\\R^b\end{array}\!-\!X^a$$

where $R^a$ = alkyl group of 1 to 8 carbon atoms, $R^b = R^a$ or $X^a$, $X^a$ = —O—, —OH, —O—, halide, —OR$^d$, OOCR$^d$, —SR$^d$, where R$^d$ is a linear or branched, saturated or unsaturated, unsubstituted or substituted alkyl group, x is $\geq 2$, and y is $\geq 1$.

The precise structure of the organotin oxides is unknown, it being assumed, however, that they are present at least as dimers.

Their use for conducting addition polymerization, polyaddition, polycondensation or curing frequently takes place in aqueous or water containing systems, in connection, for example, with the production of coatings, water-blown polymer foams, etc.

When used in aqueous or water-containing systems, organotin catalysts according to the prior art have the disadvantages of lack of solubility in water and/or lack of stability to hydrolysis and/or lack of catalytic activity.

The great majority of the known organotin compounds are insoluble or only sparingly soluble in water. If used as catalysts in aqueous systems, therefore, they cannot be used as homogeneous solutions in water but must be incorporated heterogeneously as mixtures, emulsions or suspensions, in some cases with the assistance of solvents, detergents or other auxiliaries.

Only a few organotin compounds of good solubility in water are known. Primarily these comprise highly acidic monoalkyltin and dialkyltin compounds having short-chain alkyl groups, examples being $(C_4H_9)SnCl_3$, $(CH_3)_2SnCl_2$, $(CH_3)_2Sn(O_3SCH_3)_2$, and $(C_4H_9)_2Sn(O_3SCH_3)_2$.

When such organotin compounds are dissolved in water, an at least partial hydrolysis takes place immediately; stannoxanes—which are initially soluble in the acidic system—and the corresponding acids (e.g., HCl, HO$_3$SCH$_3$) are formed. The acidic solutions which form are highly corrosive, which is disadvantageous for the majority of applications. Furthermore, the acids which are released reduce the catalytic activity of the organotin compounds, rendering such solutions unsuited to many catalytic applications (the condensation of silicones, for example).

If it is attempted to neutralize such acidic solutions, the organotin compounds are precipitated as stannoxanes, polystannoxanes or organotin oxides.

Organotin carboxylates and organotin alkoxides are generally neither soluble in water nor stable to hydrolysis. On contact with water, they decompose with the formation and precipitation of stannoxanes, polystannoxanes or organotin oxides.

Organotin mercaptides are generally likewise insoluble in water. Compared with other organotin compounds, however, they are notable for their greater stability to hydrolysis. However, the stability goes hand in hand with a markedly reduced catalytic reactivity.

While in certain systems (in a mixture with isocyanates, for example) a subsequent chemical or thermal activation of organotin mercaptides can take place, with the formation of more active catalysts, the catalytic activity of these mercaptides in less reactive systems, such as silicones, is inadequate, if indeed it is present at all.

There is thus a need to find organotin catalysts which are intended for use in aqueous or water-containing systems and which are storage-stable and soluble in water, contain no free strong acids, possess catalytic activity, and do not lose this activity even on prolonged storage in or contact with water.

SUMMARY OF THE INVENTION

The invention is directed to a process for preparing water-soluble organotin catalysts by contacting organotin compounds of a select formula with polyelectrolytes and, if appropriate, subsequent removal of water.

DETAILED DESCRIPTION OF THE INVENTION

The process of the present invention is achieved by contacting organotin compounds having the general formula I $$R_n SnX_{4-n} \qquad (I)$$

in which

R=C$_1$–C$_4$ alkyl, preferably CH$_3$ or C$_4$H$_9$ n=1 or 2,

X=anionic radical —O—, —OH, F, Br, I, Cl preferred, —OR$^1$, —SR$^1$, —OOCR$^1$, —SO$_3$R$^1$, preferably an anion of a strong acid, with particular preference for Cl or SO$_3$R$^1$, where R$^1$=unsubstituted or substituted alkyl, aryl or aralkyl and R, X and R$^1$ can each be identical or different, with polyelectrolytes, especially polymers or copolymers of the general formula(e) II and/or III $$\left[\begin{array}{c}Y\\|\\\phantom{A}\\|\\A\end{array}\right]_l\!\!\left[B\right]_m\!\!\left[\begin{array}{cc}|&|\\COOZ&COOZ\end{array}\right]_k \qquad (II)$$

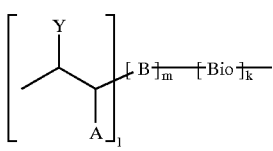
(III)

in which
Y=H or CH$_3$
A=—COOZ, —SO$_3$Z, —OSO$_3$Z or —PO$_3$Z$_2$
Bio=the radical of a biopolymer,
Z=H, an unsubstituted or substituted alkyl group or a cationic radical selected from the group consisting of alkali metal salts, alkaline earth metal salts or ammonium salts, preferably Z is H, CH$_3$, Na, K, Ca or NR$^2$R$^3$R$^4$R$^5$ where R$^2$ to R$^5$=H or a substituted or unsubstituted alkyl group of 1–10 carbon atoms, preferably CH$_3$, hydroxyethyl or hydroxyisopropyl, B=the radical of an ethylenically unsaturated monomer such as, for example, ethylene, propylene, butadiene, isoprene, vinyl chloride, vinylidene chloride or vinylidene fluoride, styrene, indene, vinyl acetate, vinyl alcohol, vinylformal, acrolein, methyl vinyl ketone, vinylpyrrolidone, maleic anhydride, acrylonitrile, vinyl ethers, (meth)acrylic acid, (meth)acrylamide, (meth)acrylic esters, cyanoacrylic esters, and the like; and Y, A, Z and B within k, 1 and m can each be identical or different, m being $\geq$0, 1 and k=0–200, especially 50–150, preferably 60–100, where 1+K$\geq$20, the ratio of (1+K)/m being chosen such that the polymers in the dissociated form are soluble in water.

The polyelectrolytes which are used in accordance with the invention can comprise both biopolymers such as algic acid, gum-arabic, nucleic acids, pectins, proteins and the like, and chemically modified biopolymers such as carboxylmethylcellulose, ligninsulfonates and, in particular, synthetic polymers such as, for example, poly(meth)acrylic acid, polyvinylsulfonic acid, polyvinylphosphoric acid (vinylphosphonic acid polymers), polymaleic acid and copolymers thereof with one another and with unsaturated olefins such as, for example, ethylene, propylene, butadiene, isoprene, vinyl chloride, vinylidene chloride or vinylidene fluoride, styrene, indene, vinyl acetate, vinyl alcohol, vinylformal, acrolein, methyl vinyl ketone, vinylpyrrolidone, maleic anhydride, acrylonitrile, vinyl ethers, (meth)acrylamide, and cyanoacrylic esters.

In accordance with the invention it is possible to use all polyelectrolytes whose proportion of dissociable groups—which can be a constituent or substituent of the polymer chain—is sufficiently great that the polymers in the dissocited form are soluble in water.

In accordance with the invention, the polyelectrolytes used are preferably the so-called polyacids. On dissociation, these give off protons to form polyanions, which can be both inorganic and organic polymers. Examples of polyacids, whose salts are referred to as polysalts, having the groups I–V as characteristic base units are: poly(meth)acrylic acid (I), polyvinylsulfuric acid (II), polyvinylsulfonic acid (III), polyvinylphosphonic acid (IV), and polymaleic acid (V):

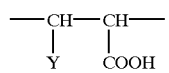
(I)

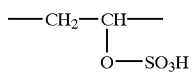
(II)

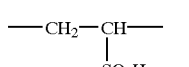
(III)

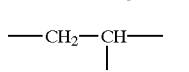
(IV)

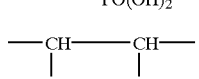
(V)

In addition to the base units having dissociable groups, it is also possible to use ethylenically unsaturated monomers such as, for example, ethylene, propylene, butadiene, isoprene, vinyl chloride, vinylidene chloride or vinylidene fluoride, styrene, indene, vinyl acetate, vinyl alcohol, vinylformal, acrolein, methyl vinyl ketone, vinylpyrrolidone, maleic anhydride, acrylonitrile, vinyl ethers, (meth)acrylic acid, (meth)acrylamide, (meth)acrylic esters, cyanoacrylic esters, and the like.

The proportion of these monomers, also ethylenically unsaturated, in the polymer can be adjusted according to the particular desired end properties of the catalyst, in respect, inter alia, of the fields of use. The distribution of the individual monomers in the polymer molecule can be random, or it is possible to polymerize blocks of individual monomers, with one another or among one another.

The sole condition is that the proportion of dissociable groups in the polymer is sufficiently great to keep both the polymer itself and the mixture, or the reaction product of compounds of the general formula (I) with the polyelectrolytes of the general formula (II), soluble in water.

Both the basic units and the processes for preparing the corresponding homopolymers and copolymers are part of the known prior art (compare CD Römpp, Chemie Lexikon-Version 1.0, Stuttgart/New York). Organotin compounds of the general formula (I) which can be used in accordance with the invention are monomethyltin, monobutyltin, dimethyltin and dibutyltin oxides, hydroxides, alkoxides, halides, mercaptides, carboxylates and sulfonates, preferably MeSnCl3, Me$_2$SnCl$_2$, BuSnCl$_3$, MeSn(O$_3$SCH$_3$)$_3$, Me$_2$Sn(O$_3$SCH$_3$)$_2$, BuSn(O$_3$SCH$_3$)$_3$ or Bu$_2$Sn(O$_3$SCH$_3$)$_2$.

The contacting or reaction can be performed, if appropriate, advantageously in aqueous solution. A preferred procedure in accordance with the invention is to carry out dropwise addition, at room temperature and with intimate mixing, of an aqueous solution of the tin compound of the general formula (I) to an aqueous solution of the polyelectrolyte, this solution being introduced into a vessel as initial charge. The rate of addition is such that the solution in said vessel remains continuously clear. At an increased rate of addition, however, it is possible to carry out subsequent stirring until the solution in said vessel becomes clear. The amount of compounds of the general formula I is chosen such that, on the one hand, the amount of Sn present is sufficient for the intended purpose and such that, on the other hand, the catalyst still remains soluble in water. Optimization can also be undertaken by means of simple preliminary tests.

Results which are positive in accordance with the invention are generally obtained if organotin compounds of the general formula I are used in a molar ratio of 0.01–0.8, in particular 0.1–0.5, based on the groups Z of the polyelecrolytes of the general formula (e) II and/or II.

The catalyst solution prepared in this way can be used directly without further treatment stages, or stored. Alternatively, it can also be dewatered and dried by means of the known techniques and stored and used in water-free form.

EXAMPLES

Parts and percentages are by weight unless stated otherwise.

Example 1

72.0 g (0.2 mol) of a 30% strength aqueous solution of poly(sodium methacrylate) (from Aldrich, $M_w$: about 6500 by GPC, $M_n$: about 4000, pH=about 9) were stirred together with 72.0 g of water. 11.0 g (0.05 mol) of dimethyltin dichloride were dissolved in 100 g of water at room temperature (pH of this solution=1). The poly(sodium methacrylate) solution was introduced into a vessel and the dimethyltin dichloride solution was added dropwise at room temperature with stirring. Stirring was continued at room temperature for 2 h to give a clear solution.

The product contained 2.3% Sn and 88% water. It had a pH of 7 and was still stable after 21 weeks of storage.

Example 2

72.0 g (0.2 mol) of a 30% strength aqueous solution of poly(sodium methacrylate) were stirred together with 72.0 g of water. 8.8 g (0.04 mol) of dimethyltin dichloride were dissolved in 49.6 g of water at room temperature (pH of this solution=1). The poly(sodium methacrylate) solution was introduced into a vessel and the dimethyltin dichloride solution was added dropwise at room temperature with stirring. Stirring was continued at room temperature for 2 h to give a clear solution.

The product contained 2.4% Sn and 85% water. It had a pH of 7 and was still stable after 17 weeks of storage.

Example 3

To prepare a 50% strength aqueous dimethyltin methylsulfonate chloride solution, 6.78 g (0.02 mol) of dimethyltin bis(methylsulfonate) and 4.40 g (0.02 mol) of dimethyltin dichloride were dissolved in 11.18 g of water and stirred at 70° C. for 4 h.

72.0 g (0.2 mol) of a 30% strength aqueous poly(sodium methacrylate) solution were stirred together with 72.0 g of water. 11.2 g (0.02 mol) of the 50% strength aqueous dimethyltin dimethylsulfonate chloride solution were added dropwise at room temperature. Stirring was conducted at room temperature for 30 minutes in order to dissolve solid constituents. Then a further 11.2 g (0.02 mol) of the 50% strength aqueous dimethyltin methylsulfonate chloride solution were added dropwise at room temperature and the mixture was stirred at 60° C. for 2 h until a clear solution was obtained.

The product contained 2.9% Sn and 80% water. It had a pH of 7 and was still stable after 15 weeks of storage.

2 g of this water-containing product were dried at 105° C. for 2 hours, giving 0.3 g of a solid having a tin content of 16%. This dry product was redissoluble at 20° C. in water; its aqueous solution showed the same properties as the water-containing product prior to drying.

Example 4

72.0 g (0.2 mol) of a 30% strength aqueous solution of poly(sodium methacrylate) were stirred together with 72.0 g of water. 13.6 g (0.04 mol) of dimethyltin bis(methylsulfonate) were dissolved in 60.0 g of water at room temperature (pH of this solution=1). The poly(sodium methacrylate) solution was introduced into a vessel and the dimethyltin bis(methylsulfonate) solution was added dropwise at room temperature with stirring. Stirring was continued at room temperature for 2 h to give a clear solution.

The product contained 2.2% Sn and 84% water. It had a pH of 7 and was still stable after 12 weeks of storage.

Example 5

Description of Experiment 5A (Comparative Example)

In a paper cup (capacity about 600 ml), 20 g of Lupranol 2022 (polyether polyol, MW about 3500, supplier: BASF) were mixed thoroughly with 0.74 g of water, 0.24 g of Silicon SC 162 [silicone] (supplier: Union Carbide) and 0.056 g of Dabco 33 LV (cocatalyst, diazabicyclooctane, 33%, supplier: Air Products Chemicals), with stirring. In order to simplify handling, a master blend of water, the silicone and Dabco was prepared beforehand and metered into the polyether polyol.

0.0133 g of dibutyltin dilaurate is added to the mixture and completely incorporated by stirring within 45 s. In order to simplify handling, the dibutyltin dilaurate was dissolved beforehand in a portion of the polyether polyol and then metered into the mixture.

To this mixture there was added 9 g of tolylene 2,4-diisocyanate (supplier: Aldrich) and the reaction mixture was stirred vigorously for 10 seconds.

A polyurethane foam was developed which expanded and, in doing so, hardened. The rise time (time to maximum expansion of the foam), height of rise (height reached on maximum expansion of the foam) and duration of hardening (time until the foam present is dried to touch) were observed.

The comparative examples 5B–5E and also the experiments 5F–5G (in accordance with the invention) were carried out analogously using the ratios of amounts given in Table 1. In all experiments in which tin catalysts were used the concentrations of tin were equal.

TABLE 1

| Example | Luprano l 2022 | Tolyene 2,4-diisocyanate | DABCO 33/0 | Silicon SC162 | Water | Catalyst |
|---|---|---|---|---|---|---|
| 5A (Comparative) | 100 parts | 45 parts | 0.28 parts | 1.2 parts | 3.7 parts | 0.066 parts of dibutyltin dilaurate |
| 5B (Comparative) | 100 parts | 45 parts | 0.28 parts | 1.2 parts | 3.7 parts | 0.023 parts of dimethyltin dichloride |

TABLE 1-continued

| Example | Luprano l 2022 | Tolyene 2,4-diisocyanate | DABCO 33/0 | Silicon SC162 | Water | Catalyst |
|---|---|---|---|---|---|---|
| 5C (Comparative) | 100 parts | 45 parts | 0.28 parts | 1.2 parts | 3.7 parts | 0.031 parts of dimethyltin bis (methylsulfonate) |
| 5D (Comparative) | 100 parts | 45 parts | 0.28 parts | 1.2 parts | 3.7 parts | 0.25 parts of poly(sodium methacrylate) solution, 30% in water |
| 5E (Comparative) | 100 parts | 45 parts | 0.28 parts | 1.2 parts | 3.7 parts | — |
| 5F | 100 parts | 45 parts | 0.28 parts | 1.2 parts | 3.7 parts | 0.53 parts of catalyst from Example 1 |
| 5G | 100 parts | 45 parts | 0.28 parts | 1.2 parts | 3.7 parts | 0.57 parts of catalyst from Example 4 |

TABLE 2

| | | Results | |
|---|---|---|---|
| Example | Rise time (min) | Height of rise (cm) | Duration of hardening until dry to touch (min) |
| 5A (Comparative) | 195 | 10.5 | 180 |
| 5B (Comparative) | 240 | 9.5 | 420 |
| 5C (Comparative) | 240 | 9.5 | 300 |
| 5D (Comparative) | 300 | 9 | 240 |
| 5E (Comparative) | 240 | 8 | 480 |
| 5F | 210 | 10 | 180 |
| 5G | 210 | 10 | 180 |

Example 6

Description of Experiment 6A (Comparative Example)

100 parts of trimethoxymethylsilane, 100 parts of water and 10.6 parts of dibutyltin dilaurate were introduced into a glass vessel and mixed together and the vessel was sealed and stored at room temperature. The condition of the mixture was assessed after 1 day.

The comparative examples 6B–6C and also the experiments 6D–6E (in accordance with the invention) were carried out analogously using the ratios of amounts given in Table 2. In all experiments in which tin catalysts were used the concentrations of tin were equal.

TABLE 3

| Example | Trimethoxymethylsilane | Water | Catalyst |
|---|---|---|---|
| 6A (Comparative) | 100 Parts | 100 Parts | 10.6 parts dibutyltin-dilaurate |
| 6B (Comparative) | 100 Parts | 65 Parts | 50 parts of poly (sodium methacrylate) solution, 30% in water |
| 6C (Comparative) | 100 parts | 100 parts | — |
| 6D | 100 parts | 24.3 parts | 85.8 parts of catalyst from Ex. 1 |
| 6E | 100 parts | 22.8 parts | 90.1 parts of catalyst from Ex. 4 |

TABLE 4

| Example | | Results: | | |
|---|---|---|---|---|
| | | Condition after 1 day | | |
| 6A (Comparative) | ½ solid | semi-hard | glassy-white | pH of aq. phase 5 |
| 6B (Comparative) | ⅓ solid | gelatinous | glassy | pH of aq. phase 10 |
| 6C (Comparative) | no solid | water-clear liquid | | pH of aq. phase 5 |
| 6D | ½ solid | soft | white | pH of aq. phase 7 |
| 6E | ½ solid | soft | white | pH of aq. phase 7 |

What is claimed is:

1. A process for preparing a water-soluble organotin catalyst by contacting organotin compounds having the general formula (I)

$$R_nSnX_{4-n} \tag{I}$$

in which

R=$C_1$–$C_4$ alkyl, n=1 or 2,

X=anionic radical —O—, —OH, F, Cl, Br, I, —$OR^1$, —$SR^1$, —$OOCR^1$, —$SO_3R^1$ where $R^1$=unsubstituted or substituted alkyl, aryl or aralkyl and R, X and $R^1$ can each be identical or different, with polyelectrolytes of the general formula(e) II and/or III

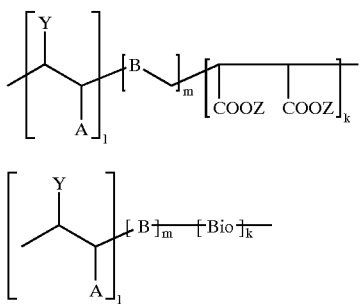

in which
Y=H or CH$_3$,
A=—COOZ, —SOOZ, —SO$_3$Z or —PO$_3$Z$_2$,
Z=H, an unsubstituted or substituted alkyl group or a cationic radical,
Bio=the radical of a biopolymer,
B=the radical of an ethylenically unsaturated monomer,
and Y, A, Z and B within k, l and m can each be identical or different, m being $\geq 0$, 1 and k=0–200, the ratio of (1+k)/m being chosen such that the polymers in the dissociated form are soluble in water, and, optionally, subsequently removing the water.

2. The process for preparing a water-soluble organotin catalyst, as claimed in claim 1, wherein Z=CH$_3$, Na, K, Ca or NR$^2$R$^3$R$^4$R$^5$ where R$^2$—R=H or a substituted or unsubstituted alkyl group.

3. The process as claimed in claim 1, wherein the organotin compound is dimethyltin dichloride, dimethyltin bis(methylsulfonate), butyltin trichloride or mixtures thereof.

4. The process as claimed in claim 1, wherein the polyelectrolyte is poly(sodium methacrylate), poly(sodium acrylate) or mixtures thereof.

5. An organotin catalyst prepared by the process of claim 1.

* * * * *